United States Patent
Hu et al.

(10) Patent No.: US 7,501,060 B2
(45) Date of Patent: Mar. 10, 2009

(54) WASTEWATER TREATING SYSTEM

(75) Inventors: Yen-Jung Hu, Hsin-Chu (TW); Hsi-Yu Chen, Tainan (TW); Wen-Chun Hwang, Tainan Hsien (TW)

(73) Assignee: Kang Na Hsiung Enterprise Co., Ltd., Tainan Hsien (TW)

( * ) Notice: Subject to any disclaimer, the term of this patent is extended or adjusted under 35 U.S.C. 154(b) by 21 days.

(21) Appl. No.: 11/714,944

(22) Filed: Mar. 7, 2007

(65) Prior Publication Data

US 2008/0011677 A1 Jan. 17, 2008

(30) Foreign Application Priority Data

Jul. 13, 2006 (TW) .............................. 95125692 A

(51) Int. Cl.
*C02F 3/06* (2006.01)
(52) U.S. Cl. ...................... 210/617; 210/626; 210/631; 210/151; 210/195.3
(58) Field of Classification Search ................ 210/615, 210/616, 617, 626, 631, 150, 151, 195.3, 210/195.4
See application file for complete search history.

(56) References Cited

U.S. PATENT DOCUMENTS

| | | | | |
|---|---|---|---|---|
| 4,080,287 A * | 3/1978 | Conway et al. | ............ | 210/150 |
| 4,680,111 A * | 7/1987 | Ueda | ............ | 210/150 |
| 4,810,377 A * | 3/1989 | Kato et al. | ............ | 210/150 |
| 4,933,076 A * | 6/1990 | Oshima et al. | ............ | 210/151 |
| 5,316,668 A * | 5/1994 | Tang | ............ | 210/151 |
| 5,609,754 A * | 3/1997 | Stuth | ............ | 210/151 |
| 5,766,454 A * | 6/1998 | Cox et al. | ............ | 210/150 |
| 5,795,480 A * | 8/1998 | Keun et al. | ............ | 210/151 |
| 6,007,712 A * | 12/1999 | Tanaka et al. | ............ | 210/151 |
| 6,210,578 B1 * | 4/2001 | Sagastume et al. | ............ | 210/151 |
| 6,982,037 B2 * | 1/2006 | Horng et al. | ............ | 210/615 |
| 6,998,048 B1 * | 2/2006 | Dobie et al. | ............ | 210/617 |
| 7,077,952 B2 * | 7/2006 | Burks | ............ | 210/151 |
| 2003/0132148 A1 * | 7/2003 | Okamoto et al. | ............ | 210/151 |
| 2004/0206699 A1 * | 10/2004 | Ho et al. | ............ | 210/617 |
| 2006/0131230 A1 * | 6/2006 | Shao et al. | ............ | 210/601 |
| 2006/0138048 A1 * | 6/2006 | Hu et al. | ............ | 210/616 |

* cited by examiner

*Primary Examiner*—Christopher Upton
(74) *Attorney, Agent, or Firm*—Bliss McGlynn, P.C.

(57) ABSTRACT

A wastewater treating system includes: a vessel defining a vessel space therein, the vessel space being partitioned into an activated sludge zone that is adapted to receive waste water and a body of an activated sludge therein, and a coarse filtering zone that is disposed downstream of and that is in fluid communication with the activated sludge zone for receiving bio-treated wastewater from the activated sludge zone; and a bed of biomass carriers colonized with microorganisms and disposed in the coarse filtering zone for further bio-treating the bio-treated wastewater from the activated sludge zone and for separating coarse suspended solids from the bio-treated wastewater in the coarse filtering zone.

10 Claims, 3 Drawing Sheets

US 7,501,060 B2

WASTEWATER TREATING SYSTEM

CROSS-REFERENCE TO RELATED APPLICATION

This application claims priority of Taiwanese Application No. 095125692, filed on Jul. 13, 2006.

BACKGROUND OF THE INVENTION

1. Field of the Invention

This invention relates to a wastewater treating system, more particularly to a wastewater treating system including a vessel partitioned into an activated sludge zone and a coarse filtering zone having a bed of biomass carriers disposed therein.

2. Description of the Related Art

Solid-liquid separation membrane bioreactors have been used in wastewater treatment. The membranes employed in the membrane bioreactors can be ultra-filtration membranes or micro-filtration membranes based on the actual requirements for separating bio-sludge thus formed from the bio-treated wastewater. The solid-liquid separation membranes used in the membrane bioreactors can be classified into a side stream type and an immersed type. Since the concentration of the sludge in a body of the bio-treated wastewater is relatively high, the immersed type solid-liquid separation membrane tends to be easily blocked by the sludge. In addition, since the solid-liquid separation membrane is immersed in the wastewater, the transmembrane pressure of the solid-liquid separation membrane is considerably increased, which results in a decrease in the membrane flux.

SUMMARY OF THE INVENTION

The object of the present invention is to provide a wastewater treating system that can overcome the aforesaid drawbacks of the prior art.

According to one aspect of this invention, there is provided a wastewater treating system that comprises: a vessel defining a vessel space therein, the vessel space being partitioned into an activated sludge zone that is adapted to receive waste water and a body of an activated sludge therein, and a coarse filtering zone that is disposed downstream of and that is in fluid communication with the activated sludge zone for receiving bio-treated wastewater from the activated sludge zone; and a bed of biomass carriers colonized with microorganisms and disposed in the coarse filtering zone for further bio-treating the bio-treated wastewater from the activated sludge zone and for separating coarse suspended solids from the bio-treated wastewater in the coarse filtering zone.

According to another aspect of this invention, there is provided a wastewater treating method that comprises the steps of: (a) subjecting the wastewater to a biological treatment process using activated sludge; (b) subjecting the bio-treated wastewater to a coarse filtering process by passing the bio-treated wastewater through a bed of biomass carriers colonized with microorganisms so as to further bio-treat the bio-treated wastewater obtained from step (a) and so as to separate coarse suspended solids from the bio-treated wastewater; and (c) subjecting the bio-treated wastewater obtained from step (b) to a fine filtering process by passing the bio-treated wastewater through a fine solid-liquid separation filter so as to separate fine suspended solids from the bio-treated wastewater.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
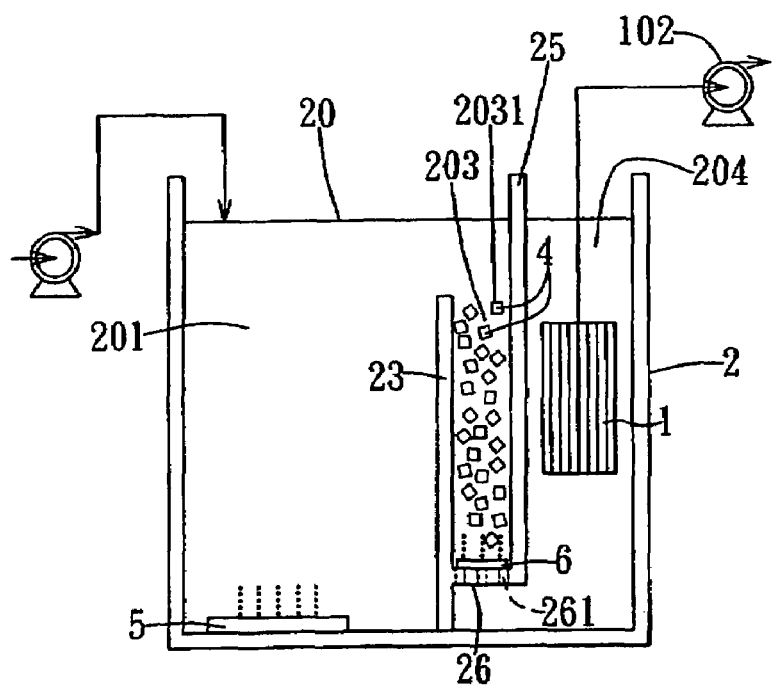
FIG. 1 is a schematic view of the first preferred embodiment of a wastewater treating system according to this invention.

Before the present invention is described in greater detail with reference to the accompanying preferred embodiments, it should be noted herein that like elements are denoted by the same reference numerals throughout the disclosure.

The present invention relates to a wastewater treating method that includes the steps of: (a) subjecting the wastewater to a biological treatment process using activated sludge; (b) subjecting the bio-treated wastewater to a coarse filtering process by passing the bio-treated wastewater through a bed of biomass carriers colonized with microorganisms so as to further bio-treat the bio-treated wastewater obtained from step (a) and so as to separate coarse suspended solids from the bio-treated wastewater; and (c) subjecting the bio-treated wastewater obtained from step (b) to a fine filtering process by passing the bio-treated wastewater through a fine solid-liquid separation filter so as to separate fine suspended solids from the bio-treated wastewater.

Preferably, the wastewater treating method further includes: settling the activated sludge in a body of the bio-treated wastewater after step (a) and before step (b); and aerating a body of the bio-treated wastewater so as to provide oxygen as well as drive suspension of the biomass carriers in the body of the bio-treated wastewater during the coarse filtering process in step (b).

Figure 2:
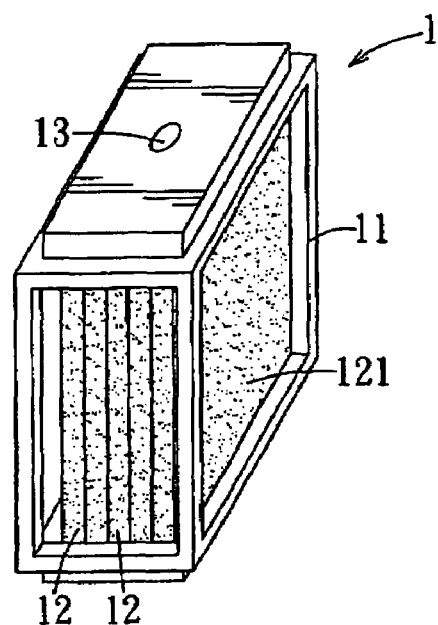
FIG. 2 is a perspective view of a plate-type solid-liquid separation filter used in the first preferred embodiment.

FIGS. 1 and 2 illustrate the first preferred embodiment of a wastewater treating system according to this invention for realizing the wastewater treating method of this invention.

The wastewater treating system includes: a vessel 2 defining a vessel space 20 for receiving the wastewater therein, the vessel space 20 being partitioned into an activated sludge zone 201 that is adapted to receive waste water and a body of an activated sludge therein, and a coarse filtering zone 203 that is disposed downstream of and that is in fluid communication with the activated sludge zone 201 for receiving bio-treated wastewater from the activated sludge zone 201; and a bed of biomass carriers 4 colonized with microorganisms and disposed in the coarse filtering zone 203 for further bio-treating the bio-treated wastewater from the activated sludge zone 201 and for separating coarse suspended solids from the bio-treated wastewater in the coarse filtering zone 203.

In this embodiment, the vessel space 20 is further partitioned into a fine filtering zone 204 that is disposed downstream of and that is in fluid communication with the coarse filtering zone 203 for receiving the bio-treated wastewater from the coarse filtering zone 203. A fine solid-liquid separation filter 1 is disposed in the fine filtering zone 204 and is immersed in a body of the bio-treated wastewater in the fine filtering zone 204 for separating fine suspended solids from the bio-treated wastewater in the fine filtering zone 204. The fine solid-liquid separation filter 1 can be a plate type filter or a hollow fiber type filter. In this embodiment, the plate type filter is used, as best illustrated in FIG. 2. The plate type solid-liquid separation filter 1 includes a casing 11 defining an effluent outlet 13, and a stack of framed membrane units 12 installed in the casing 11. Each of the framed membrane units 12 includes two opposite membranes 121 defining a gap (not shown) therebetween. The gap in each framed membrane unit 12 is in fluid communication with the effluent outlet 13. The filtrate collected in the gap in each framed membrane unit 12 is pumped out through the effluent outlet 13 by a pump 102 (see FIG. 1).

A first aerating unit 5 is disposed in the activated sludge zone 201 for providing oxygen for biological respiration and maintaining solids in suspension in the body of the bio-treated wastewater in the activated sludge zone 201. A second aerating unit 6 is disposed in the coarse filtering zone 203 for providing oxygen for further biological respiration and maintaining solids in suspension in a body of the bio-treated wastewater in the coarse filtering zone 203. In addition, the second aerating unit 6 also serves to drive suspension of the biomass carriers 4 in the body of the bio-treated wastewater in the coarse filtering zone 203.

In this embodiment, the coarse filtering zone 203 has a bottom side defined by a bottom plate 26 that is formed with a plurality of apertures 261 in fluid communication with the fine filtering zone 204 to permit flow of the bio-treated wastewater into the fine filtering zone 204. First and second partitioning walls 23, 25 are used to divide the vessel space 20 into the activated sludge zone 201 and the coarse and fine filtering zones 203, 204, and are arranged in such a manner that the bio-treated wastewater in the activated sludge zone 201 is permitted to enter into the coarse filtering zone 203 solely through a top opening 2031 of the coarse filtering zone 203 and that the bio-treated wastewater in the coarse filtering zone 203 is permitted to enter into the fine filtering zone 204 solely through a bottom side of the fine filtering zone 204.

The biomass carriers 4 are in the form of cut pieces of a non-woven fabric material which is made from a stack of bound loosened-fiber webs.

Figure 4:
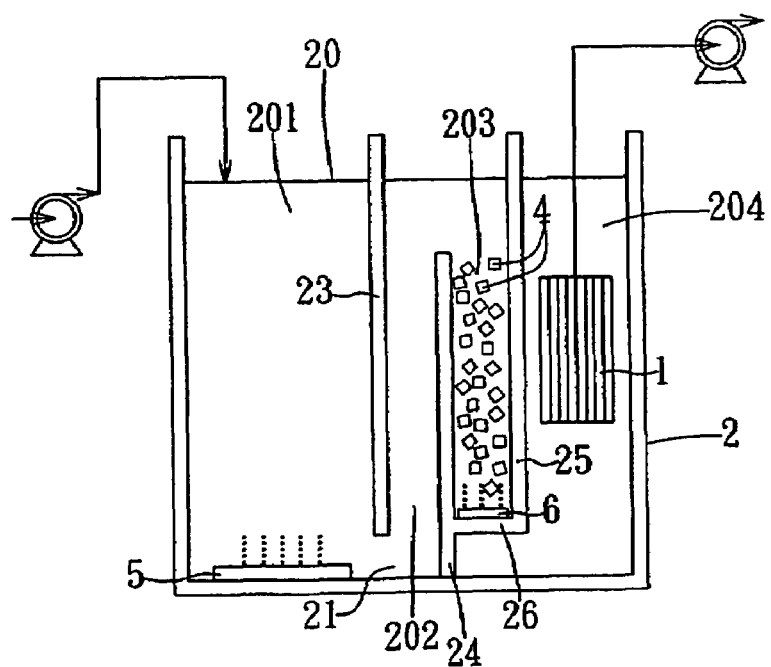
FIG. 4 is a schematic view of the second preferred embodiment of the wastewater treating system according to this invention.

FIG. 4 illustrates the second preferred embodiment of the wastewater treating system according to this invention. The second preferred embodiment differs from the previous embodiment in that the vessel space 20 is further partitioned into a sludge settling zone 202 that is disposed at a middlestream of and that is in fluid communication with the activated sludge is zone 201 and the coarse filtering zone 203 for receiving the bio-treated wastewater from the activated sludge zone 201 and for settling of the activated sludge so as to prevent the activated sludge from accompanying the bio-treated wastewater that enters into the coarse filtering zone 203. A middle partitioning wall 24 is disposed between the first and second partitioning walls 23, 25 so as to cooperate with the first and second partitioning walls 23, 25 to divide the vessel space 20 into the activated sludge zone 201, the sludge settling zone 202, and the coarse and fine filtering zones 203, 204. The first partitioning wall 23 has a lower end spaced apart from a bottom of the vessel 2 so as to define a fluid path 21 therebetween for fluid communication between the activated sludge zone 201 and the sludge settling zone 202.

Figure 5:
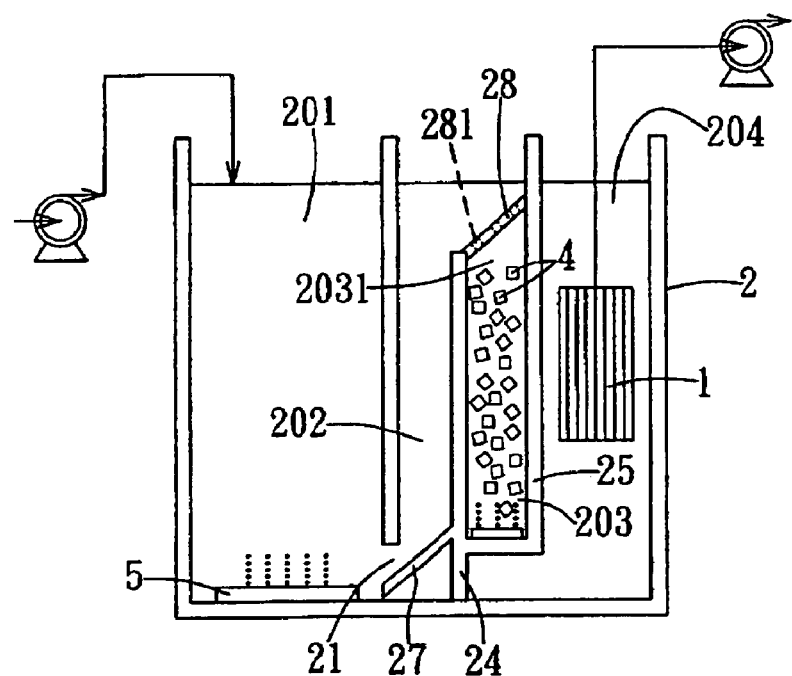
FIG. 5 is a schematic view of the third preferred embodiment of the wastewater treating system according to this invention.

FIG. 5 illustrates the third preferred embodiment of the wastewater treating system according to this invention. The third preferred embodiment differs from the second preferred embodiment in that the top opening 2031 of the coarse filtering zone 203 is covered by a first baffle plate 28. The first baffle plate 28 is formed with a plurality of through-holes 281 in fluid communication with the sludge settling zone 202 to permit flow of the bio-treated wastewater into the coarse filtering zone 203. A second baffle plate 27 extends inclinedly and downwardly from a lower end of the middle partitioning wall 24 into the fluid path 21 so as to prevent the flow of the bio-treated wastewater in the sludge settling zone 202 from being affected by the first aerating unit 5. Without the second baffle plate 27, turbulent flows are likely to occur in the body of the bio-treated wastewater in the sludge settling zone 202 due to the affect of the first aerating unit 5, which is detrimental to the settling of the activated sludge in the sludge settling zone 202.

Figure 6:
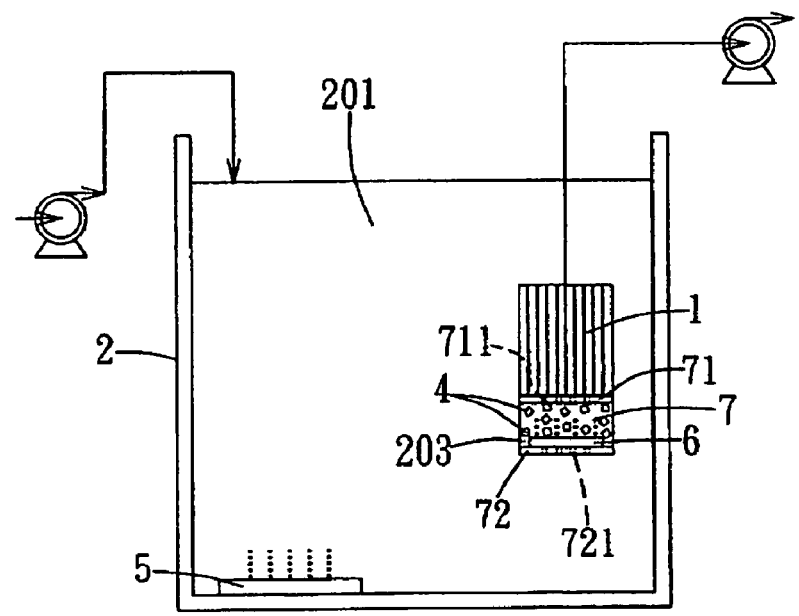
FIG. 6 is a schematic view of the fourth preferred embodiment of the wastewater treating system according to this invention.

FIG. 6 illustrates the fourth preferred embodiment of the wastewater treating system according to this invention. The fourth preferred embodiment differs from the first preferred embodiment in that the vessel space 20 is partitioned into the activated sludge zone 201 and the coarse filtering zone 203 by a box 7 which is directly connected to the solid-liquid separation filter 1. The box 7 includes upper and lower confining plates 71, 72, each of which is formed with a plurality of through-holes 711, 721. The through-holes 711 in the upper confining plate 72 are in fluid communication with the coarse filtering zone 203 and the solid-liquid separation filter 1. The through-holes 721 in the lower confining plate 72 are in fluid communication with the activated sludge zone 201 and the coarse filtering zone 203.

The merits of the wastewater treating system of this invention will become apparent with reference to the following Example and Comparative Example.

EXAMPLE 1

A vessel 2, as illustrated in FIG. 4 and having a size of 30.0×10.2×30.0 cm$^3$, was prepared for the waste water treating system. The sizes of the activated sludge zone 201, the sludge settling zone 202, and the coarse and fine filtering zones 203, 204 are 13.5×10.2×27.0 cm$^3$, 4.0×10.2×27.0 cm$^3$, 4.5×10.2×18.0 cm$^3$, 8.0×0.2×27.0 cm$^3$, respectively. The wastewater flow rate input into the vessel 2 was 14.4 liters per day. The amount of the suspended solids in the wastewater in the activated sludge zone 201 ranged from 4000 to 4500 mg per liter. The membrane cleaning frequency for the solid-liquid separation filter 1 was conducted twice per day. After the wastewater treating system reached a stable condition, an average membrane flux of about 0.8 cubic meter per square meter, a pressure drop of from 0.12 to 0.18 Kg/cm$^2$ for fluid permeating the membranes 121 of the solid-liquid separation filter 1, an amount of the suspended solids in the bio-treated wastewater in the fine filtering zone 204 ranging from 2 to 10 mg per liter, and the Chemical Oxygen Demand (COD) of an effluent from the solid-liquid separation filter 1 ranging from 21 to 27 mg per liter were obtained.

COMPARATIVE EXAMPLE 1

Figure 3:
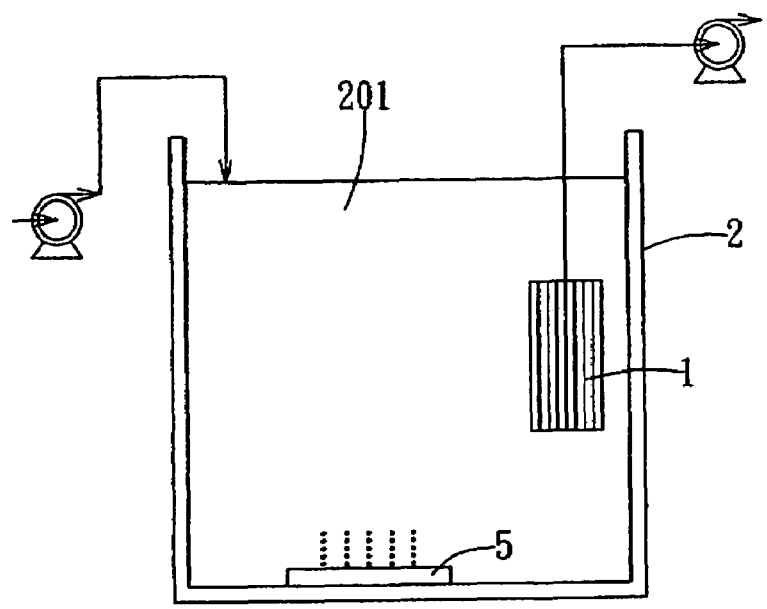
FIG. 3 is a schematic view of a comparative example of a conventional wastewater treating system.

The wastewater treating system of Comparative Example 1, as illustrated in FIG. 3, differs from Example 1 in that Comparative Example 1 does not include the sludge settling zone 202 and the coarse and fine filtering zones 203, 204. In addition, the membrane cleaning frequency for the solid-liquid separation filter 1 was conducted 4 to 6 times per day. After the wastewater treating system reached a stable condition, an average membrane flux of about 0.5 cubic meter per square meter, a pressure drop of from 0.25 to 0.30 Kg/cm$^2$ for fluid permeating the membranes 121 of the solid-liquid separation filter 1, and the COD of an effluent from the solid-liquid separation filter 1 ranging from 35 to 45 mg per liter were obtained.

The experimental results show that, with the inclusion of the biomass carriers 4 in the coarse filtering zone 203, the wastewater treating performance is considerably improved.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A wastewater treating system comprising:
    a vessel defining a vessel space therein, said vessel space being partitioned into an activated sludge zone that is adapted to receive wastewater and a body of an activated sludge therein, and a coarse filtering zone that is disposed downstream of and that is in fluid communication with said activated sludge zone for receiving bio-treated wastewater from said activated sludge zone; and
    a bed of biomass carriers colonized with microorganisms and disposed in said coarse filtering zone for further bio-treating the bio-treated wastewater from said activated sludge zone and for separating coarse suspended solids from the bio-treated wastewater in said coarse filtering zone;
    wherein said biomass carriers are in the form of cut pieces of a non-woven fabric material which is made from a stack of bound loosened-fiber webs.

2. The wastewater treating system of claim 1, wherein said vessel space is further partitioned into a sludge settling zone that is disposed at a middlestream of and that is in fluid communication with said activated sludge zone and said coarse filtering zone for receiving the bio-treated wastewater from said activated sludge zone and for settling of the activated sludge so as to prevent the activated sludge from accompanying the bio-treated wastewater that enters into said coarse filtering zone.

3. The wastewater treating system of claim 1, wherein said vessel space is further partitioned into a fine filtering zone that is disposed downstream of and that is in fluid communication with said coarse filtering zone for receiving the bio-treated wastewater from said coarse filtering zone, said wastewater treating system further comprising a fine solid-liquid separation filter disposed in said fine filtering zone for separating fine suspended solids from the bio-treated wastewater in said fine filtering zone.

4. The wastewater treating system of claim 3, wherein said coarse filtering zone has a bottom side defined by a bottom plate that is formed with a plurality of apertures in fluid communication with said fine filtering zone to permit flow of the bio-treated wastewater into said fine filtering zone, said coarse filtering zone defining a top opening that is covered by a baffle plate, said baffle plate being formed with a plurality of through-holes in fluid communication with said sludge settling zone to permit flow of the bio-treated wastewater into said coarse filtering zone.

5. The wastewater treating system of claim 1, further comprising an aerating unit disposed in said activated sludge zone for providing oxygen for biological respiration and maintaining solids in suspension in a body of the bio-treated wastewater in said activated sludge zone.

6. The wastewater treating system of claim 1, further comprising an aerating unit disposed in said coarse filtering zone for providing oxygen for biological respiration and maintaining solids in suspension in a body of the bio-treated wastewater in said coarse filtering zone.

7. A wastewater treating method comprising the steps of:
    (a) subjecting the wastewater to a biological treatment process using activated sludge;
    (b) subjecting the bio-treated wastewater to a coarse filtering process by passing the bio-treated wastewater through a bed of biomass carriers colonized with microorganisms so as to further bio-treat the bio-treated wastewater obtained from step (a) and so as to separate coarse suspended solids from the bio-treated wastewater; and
    (c) subjecting the bio-treated wastewater obtained from step (b) to a fine filtering process by passing the bio-treated wastewater through a fine solid-liquid separation filter so as to separate fine suspended solids from the bio-treated wastewater;
    wherein the biomass carriers are in the form of cut pieces of a non-woven fabric material which is made from a stack of bound loosened-fiber webs.

8. The wastewater treating method of claim 7, further comprising settling the activated sludge in a body of the bio-treated wastewater after step (a) and before step (b).

9. The wastewater treating method of claim 7, further comprising aerating a body of the bio-treated wastewater so as to provide oxygen as well as drive suspension of the biomass carriers in the body of the bio-treated wastewater during the coarse filtering process in step (b).

10. The wastewater treating method of claim 7, wherein steps (a) to (c) are conducted in a vessel that defines a vessel space therein, the vessel space being partitioned into an activated sludge zone, a coarse filtering zone disposed downstream of and in fluid communication with the activated sludge zone, and a fine filtering zone disposed downstream of and in fluid communication with the coarse filtering zone, the biomass carriers being disposed in the coarse filtering zone.

* * * * *